US012615509B2

(12) United States Patent
Hong

(10) Patent No.: US 12,615,509 B2
(45) Date of Patent: Apr. 28, 2026

(54) METHOD FOR INFORMATION TRANSMISSION, COMMUNICATION DEVICE AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 335 days.

(21) Appl. No.: 17/914,605

(22) PCT Filed: Mar. 25, 2020

(86) PCT No.: PCT/CN2020/081211
§ 371 (c)(1),
(2) Date: Sep. 26, 2022

(87) PCT Pub. No.: WO2021/189327
PCT Pub. Date: Sep. 30, 2021

(65) Prior Publication Data
US 2023/0354010 A1     Nov. 2, 2023

(51) Int. Cl.
*H04W 8/20*          (2009.01)
*H04W 8/24*          (2009.01)

(52) U.S. Cl.
CPC .............. *H04W 8/205* (2013.01); *H04W 8/24* (2013.01)

(58) Field of Classification Search
CPC ......... H04W 8/24; H04W 8/205; Y02D 30/70
See application file for complete search history.

(56) References Cited

U.S. PATENT DOCUMENTS

| | | | |
|---|---|---|---|
| 12,382,534 B2 * | 8/2025 | Chen ................... | H04W 74/002 |
| 2007/0224990 A1 | 9/2007 | Edge et al. | |
| 2015/0289141 A1 * | 10/2015 | Ghasemzadeh ... | H04W 72/0446 370/330 |
| 2018/0160422 A1 * | 6/2018 | Pathak ................... | H04W 76/10 |
| 2018/0323931 A1 * | 11/2018 | Kiyoshima ........... | H04W 72/23 |
| 2021/0345097 A1 * | 11/2021 | Wu ......................... | H04W 8/24 |
| 2022/0191696 A1 * | 6/2022 | Yoshizawa ............ | H04L 9/3213 |
| 2022/0256328 A1 * | 8/2022 | Xie ...................... | H04W 72/044 |
| 2022/0408518 A1 * | 12/2022 | Bergström .......... | H04W 60/005 |

(Continued)

FOREIGN PATENT DOCUMENTS

| | | |
|---|---|---|
| CN | 1809190 A | 7/2006 |
| CN | 102056221 A | 5/2011 |
| CN | 110463238 A | 11/2019 |

(Continued)

OTHER PUBLICATIONS

European Patent Application No. 20927693.0, Search and Opinion Nov. 22, 2023, 11 pages.

(Continued)

*Primary Examiner* — Congvan Tran
(74) *Attorney, Agent, or Firm* — Cozen O'Connor

(57) ABSTRACT

A method for information transmission is provided, which is applicable to a user equipment (UE) when communicating with a base station in a wireless communications network. The method includes: sending reporting capability information, in which the reporting capability information is configured to indicate that the UE supports reporting SIM information.

20 Claims, 5 Drawing Sheets

```
┌──────────────┐                      ┌──────────────┐
│ base station │                      │      UE      │
└──────────────┘                      └──────────────┘
```

S210: sending reporting capability information, wherein the reporting capability information is configured to indicate that the UE supports reporting SIM information S220: receiving reporting configuration sent based on the reporting capability information, wherein the reporting configuration is at least configured for the UE to determine whether to report the SIM information

(56) References Cited

U.S. PATENT DOCUMENTS

2022/0417728 A1* 12/2022 Wu ...................... H04W 12/06
2023/0047213 A1* 2/2023 Chen ................... H04W 74/002

FOREIGN PATENT DOCUMENTS

CN            110798828 A      2/2020
WO     WO 2020025015 A1      2/2020

OTHER PUBLICATIONS

PCT/CN2020/081211 International Search Report dated Dec. 21, 2020; 2 pages.

Chinese Patent Application No. 202310018964.8, Office Action dated Jan. 24, 2025, with English translation, 15 pages.

3GPP "Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2" ETSI TS 137 320 V11.4.0 Sep. 2014, 25 pages.

Indian Patent Application No. 202247059296, Office Action dated Feb. 25, 2026, 2 pages.

* cited by examiner

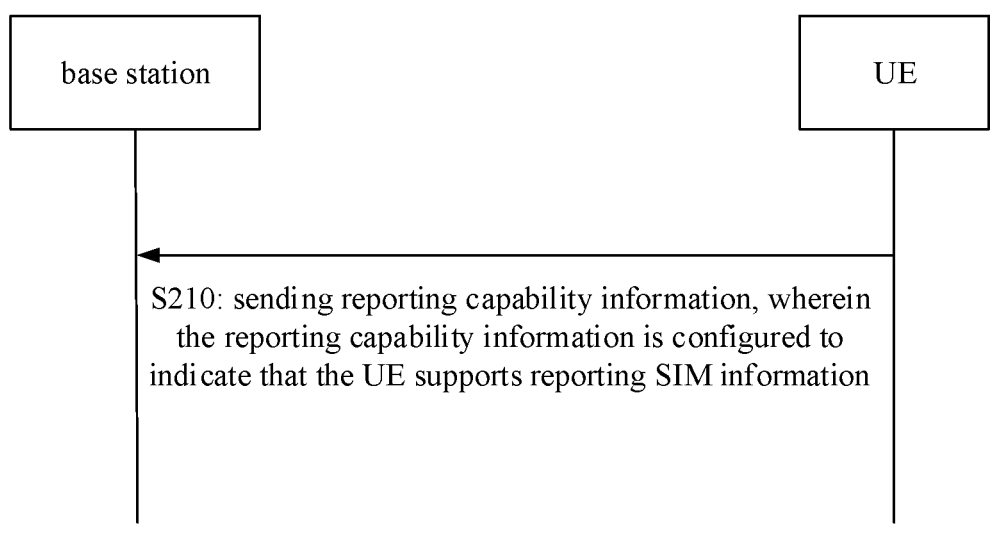

| base station | | UE |

S210: sending reporting capability information, wherein the reporting capability information is configured to indicate that the UE supports reporting SIM information

FIG. 2

| base station | | UE |

S210: sending reporting capability information, wherein the reporting capability information is configured to indicate that the UE supports reporting SIM information S220: receiving reporting configuration sent based on the reporting capability information, wherein the reporting configuration is at least configured for the UE to determine whether to report the SIM information

FIG. 3 apparatus for information transmission first sending module 610

FIG. 6 apparatus for information transmission second receiving module 710

FIG. 7

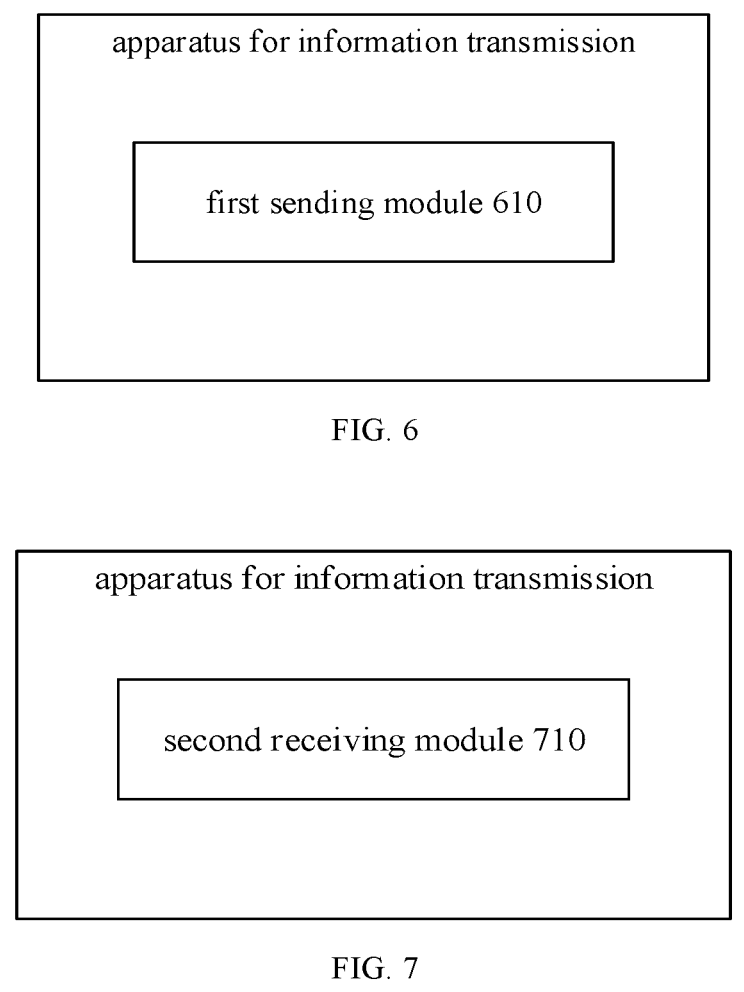

METHOD FOR INFORMATION TRANSMISSION, COMMUNICATION DEVICE AND STORAGE MEDIUM

CROSS-REFERENCE TO RELATED APPLICATION

This application is the national phase of International Application No. PCT/CN2020/081211, filed on Mar. 25, 2020, the content of which is hereby incorporated by reference in its entirety into this disclosure.

TECHNICAL FIELD

The disclosure relates to, but is not limited to, the field of wireless communication technologies, and in particular to, a method for information transmission, a communication device and a storage medium.

BACKGROUND

With the ongoing development of wireless communication technologies, there are an increasing number of multi-SIM (multiple subscriber identification modules) mobile phones on the market. Typical scenarios of multi-SIM mobile phones include the following. A business user can have a private SIM and a business SIM and the two SIMs are used on the same phone. An ordinary user can have multiple private SIMs and can choose a SIM from multiple SIMs to use according to his/her service.

These SIMs may be from the same operator or from different operators.

Currently, multi-SIM mobile phones are operated based on the implementation of various user equipment (UE) manufacturers and there is no unified regulation standard, which leads to different UE behaviors and processing manners (for example, dual-SIM single-standby, dual-SIM dual-standby single-pass, and dual-SIM dual-standby dual-pass).

For a multi-SIM UE, the network currently considers different SIMs as different UEs, and each SIM communicates with the network independently without any cooperation with other SIMs, which leads to the high energy consumption of the UE and causes situations such as one SIM in the UE preempting resources from another SIM in the same UE.

SUMMARY

According to a first aspect of the disclosure, a method for information transmission is provided, which is applicable to a UE. The method includes: sending reporting capability information, in which the reporting capability information is configured to indicate that the UE supports reporting SIM information.

According to a second aspect of the disclosure, a method for information transmission is provided, which is applicable to a base station. The method includes: receiving reporting capability information, in which the reporting capability information is configured to indicate that a UE supports reporting SIM information.

According to a third aspect of the disclosure, a communication device is provided, including a processor, a transceiver, a memory, and executable programs stored on the memory and capable of being executed by the processor. When the processor runs the executable programs, the method for information transmission provided by the technical solution according to any one of the first aspect of the disclosure or the technical solution according to any one of the second aspect of the disclosure is performed.

According to a fourth aspect of the disclosure, a computer storage medium having executable programs stored thereon is provided. When the executable programs are executed by a processor, the method for information transmission provided by the technical solution according to any one of the first aspect of the disclosure or the technical solution according to any one of the second aspect of the disclosure is performed.

It should be understood that the above general description and the following detailed description are only exemplary and explanatory, and may not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 2 is a flowchart of a method for information transmission from a user equipment (UE) to a base station according to some embodiments.

FIG. 3 is a flowchart of a method for information transmission between a UE and a base station according to some embodiments.

FIG. 6 is a block diagram of an apparatus for information transmission according to some embodiments.

FIG. 7 is a block diagram of an apparatus for information transmission according to some embodiments.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the word "if" as used herein can be interpreted as "when", "while" or "in response to determining".

Figure 1:
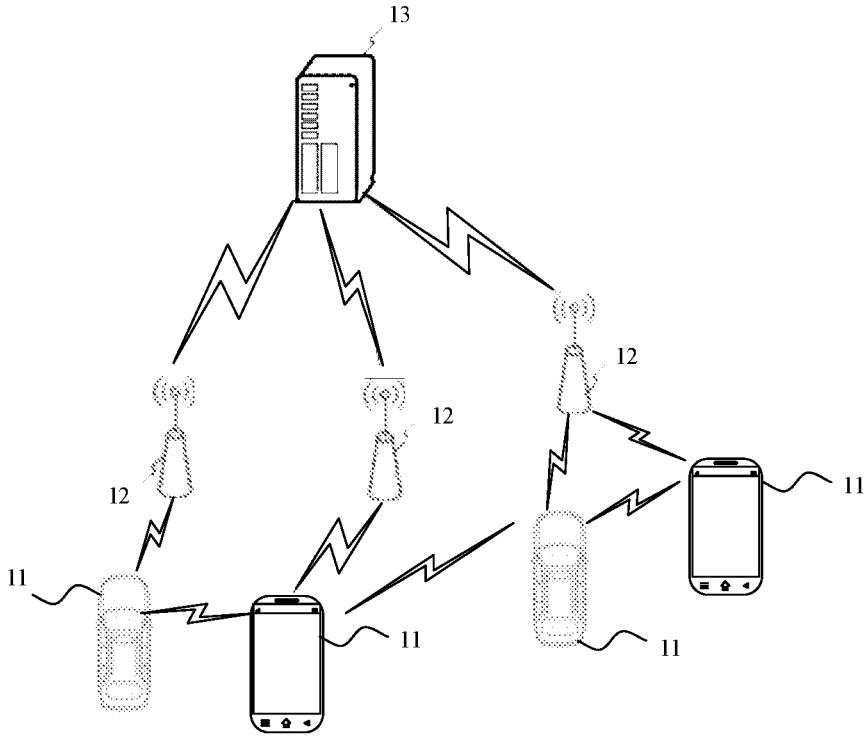
FIG. 1 is a schematic diagram of a wireless communication system according to some embodiments.

Referring to FIG. 1, FIG. 1 illustrates a schematic diagram of a wireless communication system according to some embodiments of the disclosure. As illustrated in FIG. 1, the wireless communication system is a communication system based on cellular mobile communication technologies. The wireless communication system includes UEs 11 and base stations 12.

The UE 11 may be a device that provides voice and/or data connectivity to a user. The UE 11 may communicate with one or more core networks via a radio access network (RAN). The UE 11 may be an Internet of Things (IoT) UE such as a sensor device, a mobile phone (or "cellular" phone) and a computer with the IoT UE. The UE 11 may be a fixed, portable, pocket, hand-held, computer built-in or a vehicle-mounted device, for example, a station (STA), a subscriber unit, a subscriber station, a mobile station, a mobile, a remote station, an access point, a remote terminal, an access terminal, a user terminal, a user agent, a user device, or a UE. Alternatively, the UE 11 may also be a device of an unmanned aerial vehicle. Alternatively, the UE 11 may also be a vehicle-mounted device, for example, an engine control unit (ECU) with a wireless communication function or a wireless communication device externally connected to the ECU. Alternatively, the UE 11 may also be a roadside device, for example, a street light, a signal light, or other roadside devices with a wireless communication function.

The base station 12 may be a network-side device in the wireless communication system. The wireless communication system may be a 4$^{th}$ generation (4G) mobile communication system, also known as a long term evolution (LTE) system. Or, the wireless communication system may also be a 5G system, also known as a new radio (NR) system or 5G NR system. Alternatively, the wireless communication system may also be a next-generation system of the 5G system. The access network in the 5G system may be called new generation-radio access network (NG-RAN), or machine-type communication (MTC) system.

The base station 12 may be an evolved base station (eNB) employed in the 4G system. Alternatively, the base station 12 may also be a base station (gNB) that adopts a centralized distributed architecture in the 5G system. When the base station 12 adopts the centralized distributed architecture, it usually includes a central unit (CU) and at least two distributed units (DUs). The central unit is provided with protocol stacks of a packet data convergence protocol (PDCP) layer, a radio link control (RLC) layer, and a media access control (MAC) layer. A protocol stack of a physical (PHY) layer is set in the DU. The specific implementation manner of the base station 12 is not limited in embodiments of the disclosure.

A wireless connection can be established between the base station 12 and the UE 11 through a radio air interface. In different embodiments, the radio air interface may be a radio air interface based on the 4G mobile communication network technology standard, or the radio air interface may be a radio air interface based on the 5G mobile communication network technology standard, for example, the radio air interface is a NR, or, the radio air interface may also be a radio air interface based on a next generation of 5G mobile communication network technology standard In some embodiments, an end to end (E2E) connection may also be established between the UEs 11, for example, scenes of vehicle to vehicle (V2V) communication, vehicle to infrastructure (V2I) communication and vehicle to pedestrian (V2P) communication in vehicle to everything (V2X) communication.

In some embodiments, the above wireless communication system may further include a network management device 13.

Base stations 12 are connected to the network management device 13 respectively. The network management device 13 may be a core network device in the wireless communication system, for example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS). The implementation form of the network management device 13 is not limited in some embodiments of the disclosure.

As illustrated in FIG. 2, embodiments provide a method for information transmission, which is applicable to a UE. The method includes the following step.

In S210, reporting capability information is sent, in which the reporting capability information is configured to indicate that the UE supports reporting SIM information.

In embodiments of the disclosure, the UE may be any of various types of UEs, for example, an enhance mobile broad band (eMBB) UE or a reduced capability NR device. In detail, the UE includes a mobile phone, a tablet computer, a wearable device or the like.

For example, the UE may be a multi-SIM UE capable of being installed with multiple SIMs, or a multi-SIM UE already installed with multiple SIMs.

Different types of UEs have different software and hardware capabilities. For example, the first type of UE has the capability of reporting the SIM information, while the second type of UE does not have the capability of reporting the SIM information. For example, the second type of UE may have fewer antennas than the first type of UE. For another example, the maximum bandwidth supported by the first type of UE is greater than the maximum bandwidth supported by the second type of UE.

In some cases, the capability of reporting the SIM information needs to be subscribed for reporting the SIM information. For example, the UE activates the reporting service on the cellular mobile communication network, so as to have the capability of reporting the SIM information. The UE sends the reporting capability information to the base station, in which the reporting capability information indicates whether it has the capability of reporting information of multiple SIMs.

Whether the UE has the capability of reporting information of multiple SIMs can be informed to the base station by the UE. The reporting capability information includes at least one bit. For example, when the reporting capability information corresponds to one bit, two values "0" and "1" of this bit may be used to indicate the two states respectively, i.e., the UE has the capability of reporting information of multiple SIMs and the UE does not have the capability of reporting information of multiple SIMs. Therefore, in some embodiments, the reporting capability information is at least configured to indicate whether the UE supports reporting information of multiple SIMs.

The SIM may be a SIM existing as a single entity or an embedded SIM (e-SIM) integrated in the UE, or the like.

There may be various specific types of SIMs, for example, including but not limited to a universal SIM (USIM). By reporting the reporting capability information, the UE can inform the base station whether it supports reporting information of multiple SIMs. The SIM information includes at least one of: an SIM identity (ID) and/or SIM state information. The SIM ID is configured to identify the SIM. If the UE reports the SIM IDs of multiple SIMs, the base station knows how many SIMs in the UE, and the SIM IDs of these SIMs. During paging for a UE having multiple SIMs, in order to reduce paging collisions, the paging time may be determined according to the SIM IDs.

The SIM state information is configured to indicate the state of the corresponding SIM, for example, indicate the enabled and/or disenabled state of the corresponding SIM, and for another example, indicate whether the corresponding SIM is normal, that is, some SIMs are in an abnormal state that may not communicate due to incorrect insertion positions, and some SIMs do not insert into the SIM slot.

At this time, after the base station knows whether the UE has the capability of reporting information of multiple SIMs, and it is determined that the UE supports reporting information of multiple SIMs, and when the base station needs to know the information of multiple SIMs, the UE is instructed to report, so as to assist the base station to achieve optimal scheduling of resources and transmission. For example, according to the SIM information reported by the UE, multi-SIM collaboration in the UE is realized, so that the effective utilization of resources is improved, and the high communication quality of the UE with the low power consumption is realized.

For example, manners of processing multi-SIM mobile phones are based on implementation of various UE manufacturers and there is no unified regulation standard, which leads to different UE behaviors and processing manners (for example, dual-SIM single-standby, dual-SIM dual-standby single-pass, and dual-SIM dual-standby dual-pass), and the following problems.

When the multi-SIM UE is in a first system, it needs to detect a second system from time to time by monitoring paging proportionally, performing measurements, reading system messages or the like, which may affect the performance of the first system. For example, one SIM is connected to the first system, and another SIM is idle for detecting the second system. However, these two SIMs share the same antenna panel, which may cause interference. The first system and the second system may be communication systems supporting different system bandwidths, or communication systems supporting different communication protocols. For example, the first system may be 5G, and the second system may be 4G or 3G. If one SIM uses 5G for communication, and another SIM frequently preempts the software and hardware resources shared by the UE such as the antenna panel to measure the 4G system, 5G data transmission is interrupted frequently. At this time, when the base station finds the information of the two SIMs in the UE, it can reduce the measurement activities of the SIM that measures 4G by sending scheduling instructions, so as to reduce the conflict caused by the preemption of the resources of the two SIMs in the UE, realizing the optimal allocation of resources at the same time, and reducing the interruption of 5G data transmission.

In some embodiments, the paging time is calculated according to the UE ID, and a multi-SIM UE may cause systematic paging collisions due to multiple SIMs. Since the UE reports the information of its own multiple SIMs, and when the base station needs to page multiple SIMs in the UE at the same time, according to the priorities of the SIMs, the SIM with the high urgency or the important SIM can be preferentially paged in a descending order, so as to reduce paging collisions.

When the multi-SIM UE receives the paging message on the second system, it needs to decide whether to respond to the paging, which is performed based on the paging response rules. When the multi-SIM UE determines to respond to the paging message corresponding to the second system, it needs to stop the work currently being performed in the first system. In the absence of a suspension mechanism for the current activity, the UE will automatically disconnect the radio resource control (RRC) connection with the first system and leave. Moreover, when the UE leaves, the first system will continue to page the UE, thereby causing waste of paging resources. Therefore, by reporting the information of multiple SIMs, the UE facilitates the base station to deliver the paging response rules to respond to the paging message. The paging response rules may also be configured by the UE according to user instructions, and may be reported by the UE to the base station. If it is found that the paging message of the second system is not responded in time, the base station may determine the reason for not responding in time according to the paging response rules, or determine the appropriate paging message sent to the SIM of the second system according to the paging response configured by the UE and the information of multiple SIMs in the UE.

In some embodiments, if the UE supports reporting information of multiple SIMs, that is, the UE has the capability of reporting information of multiple SIMs, the base station may send reporting configuration to the UE, and the reporting configuration is configured to indicate whether the UE is permitted to perform reporting of information of multiple SIMs and/or how to perform reporting of information of multiple SIMs.

In some embodiments, regardless of whether the UE supports reporting information of multiple SIMs, that is, regardless of whether the UE has the capability of reporting information of multiple SIMs, the base station will send the reporting configuration to the UE based on the received reporting capability information. If the UE does not support reporting information of multiple SIMs, the reporting configuration indicates that the UE is prohibited from reporting information of multiple SIMs or the UE does not need to report the information of multiple SIMs. If the UE supports reporting information of multiple SIMs, the reporting configuration may be configuration information sent by the base station according to whether it is necessary for the UE to report and the SIM information that needs to be reported by the UE.

The SIM information includes one or more pieces of information describing the SIM, for example, including but not limited to the SIM ID and/or SIM state information.

As illustrated in FIG. 3, the method further includes the following step.

In S220, reporting configuration sent based on the reporting capability information is received, in which the reporting configuration is at least configured for the UE to determine whether to report the SIM information.

In some embodiments, the reporting configuration may include at least one bit, for example, one bit in the reporting configuration is dedicated to indicating whether the UE is permitted to report the information of multiple SIMs.

In some embodiments, the reporting configuration further includes other configurations for instructing the UE to report the information of multiple SIMs, for example, time-frequency resources for reporting the information of multiple SIMs. At this time, the reporting configuration may not specifically carry the bit indicating that the UE is permitted to report the information of multiple SIMs, but configuration information that controls the UE how to report the multi-SIM information is carried in the configuration information, and the UE is permitted to report the information of multiple SIMs by default. If the multiple indication bits of the reporting configuration are preset sequence values, it can be considered that the reporting configuration does not carry configuration information that controls the UE how to report the SIM information, and at this time, it can be considered that the base station does not permit the UE to report the information of multiple SIMs.

In some embodiments, S220 includes: receiving the reporting configuration sent when the base station determines that the UE has the capability of reporting information of multiple SIMs based on the reporting capability information. If the UE is not instructed to report the information of multiple SIMs, the base station may not send the reporting configuration, which further reduces the signaling overhead of the base station.

In some embodiments, the reporting configuration includes at least one of: reporting permission information, configured to indicate whether the UE is permitted to report the SIM information; reporting time limit information, configured to indicate a reporting time limit of the SIM information; reporting condition information, configured to indicate a reporting condition of the SIM information; reporting content information, configured to indicate reporting content of the SIM information; or reporting format information, configured to indicate an information format of the SIM information.

If the reporting permission information indicates that the UE has the reporting permission, it means that the UE is permitted to report the information of multiple SIMs. If the reporting permission information indicates that the UE does not have the reporting permission, it means that the UE is prohibited from reporting the information of multiple SIMs. For example, the reporting permission information may be indicated by different values carried by at least one bit.

The reporting time limit information is configured to indicate limit time requirements that the UE needs to meet when reporting information of multiple SIMs, so as to reduce the phenomenon of the large wireless environment interference and a large amount of information that needs to be decoded by the base station, which is caused by unnecessary reporting by the UE.

For example, the reporting time limit information may include time information indicating that the UE is permitted to report; and/or time information indicating that the UE is prohibited from reporting. If the reporting time limit information includes the time information indicating that the UE is permitted to report, and when the UE is permitted to report the information of multiple SIMs, the information of multiple SIMs is reported within a time period indicated by the time information. If the reporting time limit information includes the time information indicating that the UE is prohibited from reporting, and when the UE is permitted to report the information of multiple SIM, the information of multiple SIMs is reported at other reporting time period other than the time period indicated by the time information.

There is at least one SIM in the UE. When reporting the SIM information, it is not necessary to report all the SIM information. For example, some SIMs are disenabled, and some SIMs are not inserted into the SIM slots, so the SIM information may not be reported or does not need to be reported.

At this time, the base station may indicate the reporting condition of the SIM information to be reported to the UE through the reporting condition information.

The reporting content information can be used to indicate the reported content to the UE, for example, only the SIM ID or SIM state information needs to be reported, or the SIM ID and SIM state information need to be reported at the same time.

The reporting format information indicates a format used for the SIM information. In this way, the SIM information is encoded according to the reporting format, which is convenient for the base station to decode.

For example, the reporting time limit information includes: stop timer information, including timing information of a stop timer of stopping reporting of the SIM information; and/or trigger timer information, including timing information of a trigger timer of permitting reporting the SIM information.

The stop timer information is configured to trigger the UE to set the stop timer, and within the time period of the timer, the UE is prohibited from reporting the SIM information.

The trigger timer information is configured to trigger the UE to set to the trigger timer, and within the time period of the timer, and if the UE needs to report the SIM information, it can report the SIM information.

In some embodiments, the start timing of the stop timer and/or the trigger timer starts after receiving the reporting configuration, and in other embodiments, it may also start at the starting time indicated by the reporting configuration.

Both the stop timer and/or the trigger timer can work periodically. For example, the time domain is divided into multiple reporting periods, and a stop timer and/or a trigger timer is set in one reporting period, and the starting time of the stop timer and/or the trigger timer may be determined in accordance with the agreement or negotiation with the base station, or the starting time of the stop timer or the trigger timer may be the starting time of the reporting period.

If the reporting time limit information includes both the stop timer information and the trigger timer information, the timing period of the stop timer and the timing period of the trigger timer are different.

The base station sends the reporting configuration. If the UE starts the stop timer and/or the trigger timer according to the reporting configuration, the base station can also start the stop timer and/or the trigger timer according to the reporting configuration configured by itself, so as to know when to receive the SIM information reported by the UE.

The timing period of the stop timer and the timing information of the trigger timer and/or the timing information of the trigger timer may include at least one of: starting time indication information; timing duration indication information; timing stop indication information; or indication information of whether the timing is periodic.

In some embodiments, the reporting condition information includes: first condition information, configured to indicate to report SIM information of an enabled SIM; or, second condition information, configured to indicate to report SIM information of a disenabled SIM; or, third condition information, configured to indicate to report SIM information of an enabled SIM and SIM information of a disenabled SIM.

In some cases, the base station only wants to know the SIM information of the currently enabled SIM in the UE. At this time, the reporting configuration information may carry the first condition information, and the first condition information indicates that when reporting the SIM information, the UE only reports the enabled SIM information, that is, the information of the SIM in the enabled state.

The second condition information indicates that the UE reports the disenabled SIM information. In this way, the base station knows which SIM in the UE is currently in the disenabled state, and the disenabled SIM may not compete with the enabled SIM for hardware resources in the UE. The disenabled SIM information is information of the SIM in the disenabled state.

The third condition information instructs the UE to report the information of each SIM, regardless of whether each SIM is currently enabled or disenabled, so as to facilitate the base station to fully understand the state of each SIM in the UE.

In some embodiments, the reporting content information is configured to indicate to report an SIM ID and/or SIM state information.

In some embodiments, the method further includes: reporting information of at least one SIM in the UE based on the reporting configuration in response to the reporting configuration permitting the UE to report the SIM information.

When it is determined according to the reporting permission information in the reporting configuration that the UE is permitted to report the SIM information, the information of at least one SIM in the UE will be reported according to the reporting configuration. For example, according to the reporting time limit information in the reporting configuration, within the timing period of the trigger timer or beyond the timing period of the stop timer, the information of at least one SIM determined according to the reporting condition is reported. The content included in the specific SIM information may be determined according to the reported content information. The information format adopted by the SIM information may be determined according to the reporting format, that is, at least the reporting format information is adopted.

In some embodiments, S220 includes: reporting the information of the at least one SIM in the UE by using a RRC signaling.

In some embodiments of the disclosure, the UE uses the RRC signaling to report the information of the at least one SIM in the UE, for example, the UE assistance information signaling in the RRC signaling may be used.

The RRC signaling is used to report the SIM information, which has the strong transmission flexibility.

In other embodiments, the UE may also report the SIM information according to the reporting configuration, based on an uplink control information (UCI) or MAC layer signaling, which is not limited to the RRC signaling. The RRC signaling used to report is equivalent to transforming the UCI of the physical layer or the MAC layer signaling, which has the characteristics of less difficulty in signaling transformation and strong compatibility with the related art.

In some embodiments, reporting the information of the at least one SIM in the UE by using the RRC signaling includes: reporting the information of the at least one SIM in the UE by using a UE assistance information signaling in the RRC signaling.

For example, the UE may add a new MUSIM information element in the UE assistance information signaling and carry information of the at least one SIM in the UE in this element.

After the state of the multi-SIM terminal changes, the multi-SIM terminal can send the latest information of multiple SIMs to the base station through the UE assistance information signaling under the condition that the reporting configuration configured by the base station is satisfied.

In some embodiments, S210 includes: reporting the reporting capability information by using a UE evolved universal terrestrial radio access capability (UE-EUTRA-Capability) signaling; or, reporting the reporting capability information by using a UE new radio capability (UE-NR-Capability) signaling.

If the network accessed by the UE is a 4G network, the UE-EUTRA-Capability signaling is used to send the reporting capability information. If the network accessed by the UE is a 5G network, the UE-NR-Capability signaling is used to send the reporting capability information.

In this way, regardless of whether the 4G network or the 5G network is accessed by the UE, the reporting capability information can be sent by multiplexing the existing RRC signaling in the related art, instead of rewriting and designing an RRC signaling, so as to have the characteristics of strong compatibility with the related art and to be implemented easily.

The UE-EUTRA-Capability signaling and the UE-NR-Capability signaling can both be signalings used by the terminal to report other capabilities of the terminal in the related art. In embodiments of this disclosure, the idle bits or the reserved sequence of occupied bits in any one of the two signalings are multiplexed to carry the SIM information, so that the existing RRC signaling is better used. For example, the UE-EUTRA-Capability signaling and the UE-NR-Capability signaling may be used for reporting various capabilities such as whether the terminal supports multiple-input multiple-output (MIMO) and whether it supports beam transmission. In embodiments of this disclosure, one or both of the UE-EUTRA-Capability signaling and the UE-NR-Capability signaling are also used to send the capability report indicating whether the terminal supports reporting the SIM information.

In some embodiments, S220 includes: receiving a RRC reconfiguration signaling sent based on the reporting capability information and carrying the reporting configuration; or, receiving a RRC connection reconfiguration signaling sent based on the reporting capability information and carrying the reporting configuration.

For example, if the UE is currently accessing to a 4G network, the UE may receive the RRC connection reconfiguration sent by the 4G network, and obtain the reporting configuration in the RRC connection reconfiguration.

For another example, if the UE is currently accessing to a 5G network, the UE may receive the reporting configuration by receiving the RRC reconfiguration signaling sent by the base station.

In conclusion, in embodiments of the disclosure, the terminal can receive the reporting configuration when receiving the RRC connection reconfiguration signaling or RRC reconfiguration signaling for connection control, and does not need to receive the additional dedicated signaling, which has the characteristics of easy implementation and strong compatibility with the related art.

For example, there is an information element (IE) in both the RRC connection reconfiguration signaling and the RRC reconfiguration signaling, which is called other config IE, and the other config IE reserves a part of idle bits or idle sequences that can be used to carry the reporting configuration.

Figures 4, 5:
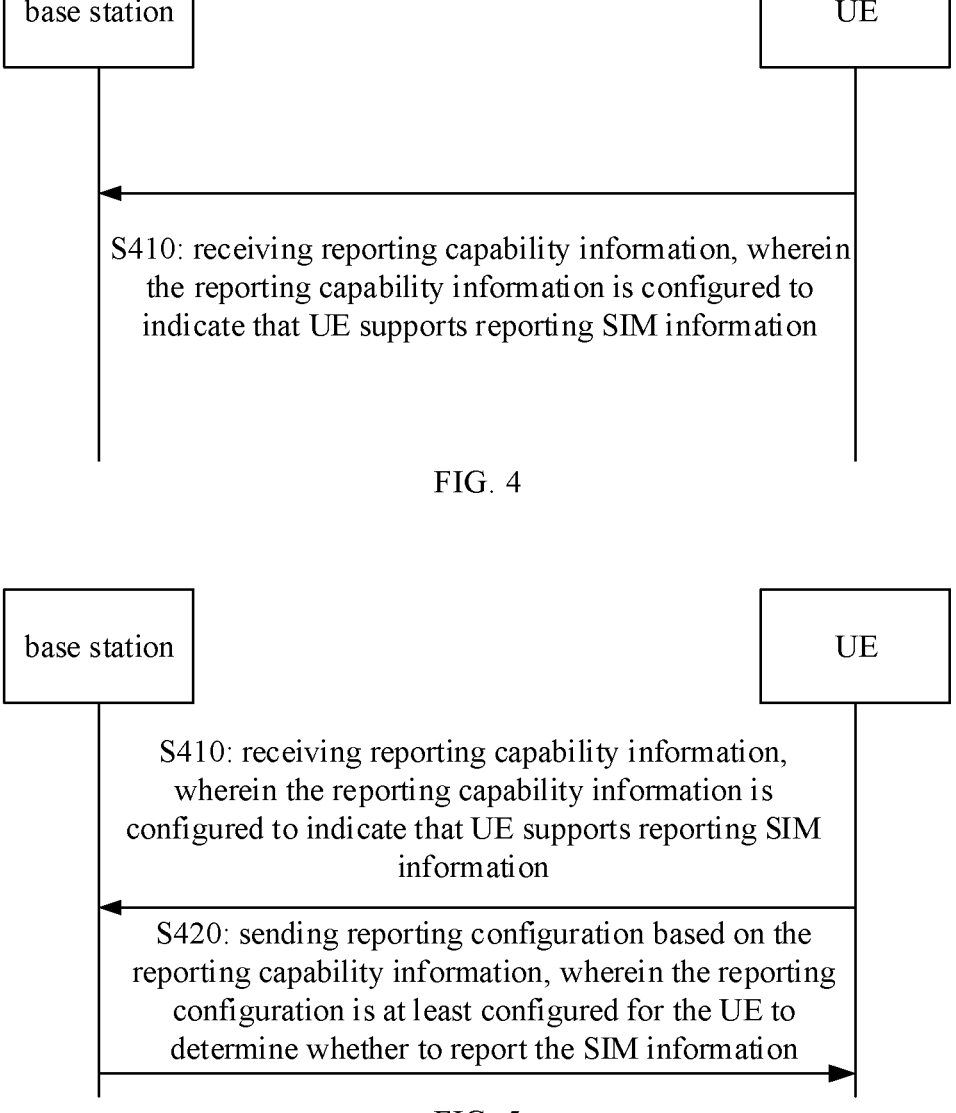
FIG. 4 is a flowchart of a method for information transmission in a base station according to some embodiments.
FIG. 5 is a flowchart of another method for information transmission between a base station and a UE according to some embodiments.

As illustrated in FIG. 4, embodiments provide a method for information transmission, which is applicable to a base station. The method includes the following step.

In S410, reporting capability information is received, in which the reporting capability information is configured to indicate that a UE supports reporting SIM information.

The base station knows whether the UE has the capability of reporting the information of at least one SIM in the terminal by receiving the above reporting capability information. In this way, when the base station wants to know the information of the at least one SIM in the UE, it can send a reporting instruction to the UE that supports reporting, thereby receiving the information of the at least one SIM in the UE.

As illustrated in FIG. 5, the method further includes the following step.

In S420, reporting configuration is sent based on the reporting capability information, in which the reporting configuration is configured for the UE to determine whether to report the SIM information.

In some embodiments, S420 includes: sending the reporting configuration according to whether the UE supports reporting the SIM information indicated by the reporting capability information.

For example, when the UE supports reporting the SIM information, the reporting configuration is sent. When the UE does not support reporting the SIM information, the reporting configuration is not sent.

Or, when the UE supports reporting the SIM information, according to whether the base station needs to obtain the SIM information of the UE, the reporting configuration is sent to the UE that supports reporting the SIM information. When the UE does not support reporting the SIM information, the reporting configuration that does not require (or prohibit) the UE to report the SIM information is sent to the corresponding UE.

By sending the reporting configuration, the base station can control reporting the SIM information in the UE.

In some embodiments, the reporting configuration includes at least one of: reporting permission information, configured to indicate whether the UE is permitted to report the SIM information; reporting time limit information, configured to indicate a reporting time limit of the SIM information; reporting condition information, configured to indicate a reporting condition of the SIM information; reporting content information, configured to indicate reporting content of the SIM information; or reporting format information, configured to indicate an information format of the SIM information.

For the relevant content of various information in the reporting configuration herein, reference may be made to the corresponding description in the foregoing embodiments, which will not be repeated herein.

In some embodiments, the reporting time limit information includes: stop timer information, including timing information of a stop timer of stopping reporting the SIM information; and/or, trigger timer information, including timing information of a trigger timer of permitting reporting the SIM information.

In some embodiments, the reporting condition information includes: first condition information, configured to indicate to report SIM information of an enabled SIM; or, second condition information, configured to indicate to report SIM information of a disenabled SIM; or, third condition information, configured to indicate to report SIM information of an enabled SIM and SIM information of a disenabled SIM.

For example, the reporting content information is configured to indicate to report an SIM ID and/or SIM state information.

In some embodiments, the method further includes: receiving SIM information in response to the reporting configuration permitting the UE to report the SIM information.

In some embodiments, S420 includes: receiving an RRC signaling carrying information of at least one SIM in the UE.

The UE reports through the RRC signaling, so the base station will receive the information of at least one SIM reported by the terminal through the RRC signaling.

In some embodiments, receiving the RRC signaling that carries the information of the at least one SIM in the UE includes: receiving a UE assistance information signaling in the RRC signaling, in which the UE assistance information carries the information of the at least one SIM in the UE.

In some embodiments, receiving the reporting capability information includes: receiving a UE-EUTRA-Capability signaling carrying the reporting capability information; or, receiving a UE-NR-Capability signaling carrying the reporting capability information.

In some embodiments, sending the reporting configuration sent based on the reporting capability information includes: sending a RRC reconfiguration signaling carrying the reporting configuration based on the reporting capability information; or, sending a RRC connection reconfiguration signaling carrying the reporting configuration based on the reporting capability information.

As illustrated in FIG. 6, embodiments provide an apparatus for information transmission, which is applicable to a UE. The apparatus includes: a first sending module 610, configured to send reporting capability information, in which the reporting capability information is configured to indicate that the UE supports reporting SIM information.

In some embodiments, the first sending module 610 may be a program module. After the program module is executed by a processor, the reporting capability information can be sent.

In some embodiments, the first sending module 610 may be a software-hardware module, and the software-hardware module includes but is not limited to a complex programmable array or a field programmable array.

In some embodiments, the first sending module 610 may be a pure hardware module, and the pure hardware module includes but is not limited to an application specific integrated circuit.

In some embodiments, the apparatus further includes: a first receiving module, configured to receive reporting configuration sent based on the reporting capability information, in which the reporting configuration is at least configured for the UE to determine whether to report the SIM information.

In some embodiments, the reporting configuration includes at least one of: reporting permission information, configured to indicate whether the UE is permitted to report the SIM information; reporting time limit information, configured to indicate a reporting time limit of the SIM information; reporting condition information, configured to indicate a reporting condition of the SIM information; reporting content information, configured to indicate reporting content of the SIM information; or reporting format information, configured to indicate an information format of the SIM information.

In some embodiments, the reporting time limit information includes: stop timer information, including timing information of a stop timer of stopping reporting the SIM information; and/or, trigger timer information, including timing information of a trigger timer of permitting reporting the SIM information.

In some embodiments, the reporting condition information includes: first condition information, configured to indicate to report SIM information of an enabled SIM; or, second condition information, configured to indicate to report SIM information of a disenabled SIM; or, third condition information, configured to indicate to report SIM information of an enabled SIM and SIM information of a disenabled SIM.

In some embodiments, the reporting content information is configured to indicate to report an SIM ID and/or SIM state information.

In some embodiments, the first sending module 610 is configured to, report information of at least one SIM in the UE based on the reporting configuration in response to the reporting configuration permitting the UE to report the SIM information.

In some embodiments, the first sending module 610 is configured to report the information of the at least one SIM in the UE by using an RRC signaling.

In some embodiments, the first sending module 610 is configured to report the information of the at least one SIM in the UE by using a UE assistance information signaling in the RRC signaling.

In some embodiments, the first sending module 610 is configured to report the reporting capability information by using a UE evolved universal terrestrial radio access capability (UE-EUTRA-Capability) signaling; or, report the reporting capability information by using a UE new radio capability (UE-NR-Capability) signaling.

In some embodiments, the first receiving module is configured to receive a RRC reconfiguration signaling sent based on the reporting capability information and carrying the reporting configuration; or, receive a RRC connection reconfiguration signaling sent based on the reporting capability information and carrying the reporting configuration.

As illustrated in FIG. 7, embodiments provide an apparatus for information transmission, which is applicable to a base station. The apparatus includes: a second receiving module 710, configured to receive reporting capability information, in which the reporting capability information is configured to indicate that a UE supports reporting SIM information.

In some embodiments, the second receiving module 710 may be a program module. After the program module is executed by a processor, the reporting capability information is received.

In some embodiments, the second receiving module 710 may be a software-hardware module, and the software-hardware module includes but is not limited to a complex programmable array or a field programmable array.

In some embodiments, the second receiving module 710 may be a pure hardware module, and the pure hardware module includes but is not limited to an application specific integrated circuit.

In some embodiments, the apparatus further includes: a second sending module, configured to send reporting configuration based on the reporting capability information, in which the reporting configuration is configured for the UE to determine whether to report the SIM information.

In some embodiments, the reporting configuration includes at least one of: reporting permission information, configured to indicate whether the UE is permitted to report the SIM information; reporting time limit information, configured to indicate a reporting time limit of the SIM information; reporting condition information, configured to indicate a reporting condition of the SIM information; reporting content information, configured to indicate reporting content of the SIM information; or reporting format information, configured to indicate an information format of the SIM information.

In some embodiments, the reporting time limit information includes: stop timer information, including timing information of a stop timer of stopping reporting the SIM information; and/or, trigger timer information, including timing information of a trigger timer of permitting reporting the SIM information.

In some embodiments, the reporting condition information includes: first condition information, configured to indicate to report SIM information of an enabled SIM; or, second condition information, configured to indicate to report SIM information of a disenabled SIM; or, third condition information, configured to indicate to report SIM information of an enabled SIM and SIM information of a disenabled SIM.

In some embodiments, the reporting content information is configured to indicate to report an SIM ID and/or SIM state information.

In some embodiments, the apparatus further includes: receive SIM information in response to the reporting configuration permitting the UE to report the SIM information.

In some embodiments, the second receiving module 710 is configured to receive a RRC signaling carrying information of at least one SIM in the UE.

In some embodiments, the second receiving module 710 is configured to receive a UE assistance information signaling in the RRC signaling, in which the UE assistance information carries the information of the at least one SIM in the UE.

In some embodiments, the second receiving module 710 is configured to receive a UE-EUTRA-Capability signaling carrying the reporting capability information; or, receive a UE-NR-Capability signaling carrying the reporting capability information.

In some embodiments, the second sending module is configured to send a RRC reconfiguration signaling carrying the reporting configuration based on the reporting capability information; or, send a RRC connection reconfiguration signaling carrying the reporting configuration based on the reporting capability information.

A specific example is provided below in combination with any one of the above embodiments.

EXAMPLE 1

This example provides a method for providing UE information and state. Firstly, the multi-SIM UE needs to report the reporting capability information to the base station through the RRC signaling on whether it supports reporting the SIM information in the multi-SIM UE.

For example, for a 4G network, the RRC signaling may be the UE-EUTRA-Capability signaling, and the reporting capability information may be carried in an Other Parameter information element in the UE-EUTRA-Capability signaling.

For a 5G network, the RRC signaling can be a UE-NR-Capability signaling, so the reporting capability information can be carried in the UE-NR-Capability signaling.

After acquiring the reporting capability information sent by the multi-SIM UE, the base station configures the reporting configuration of reporting the SIM information for the multi-SIM UE through the RRC signaling. The reporting configuration includes but is not limited to at least one of the followings: whether to permit the UE to report the reporting permission information of the SIM information; indication information of reporting requirements of the SIM information and state in the multi-SIM UE (for example, the duration of the stop timer for reporting the multi-SIM information and state), which is the reporting time limit information; a condition for reporting the SIM information and state in the multi-SIM UE (for example, to report information of only the enabled SIM, or information of only the disenabled SIM, or information of both enabled SIM and the disenabled SIM); indication information of the reporting content of the SIM information in the multi-SIM UE, that is, the above reporting content information; or indication information of the reporting format of the SIM information in the multi-SIM UE, that is, the above reporting format information.

For a 4G network, the RRC signaling may be the RRC connection reconfiguration signaling. For example, the reporting configuration may be carried in the other config information element in the RRC connection reconfiguration signaling.

For a 5G network, the RRC signaling may be the RRC reconfiguration signaling. For example, the reporting configuration may be carried in the other config information element in the RRC reconfiguration signaling.

After a multi-SIM UE that supports the capability of reporting multi-SIM information and state receives the reporting configuration, if the base station permits it to report the SIM information, the multi-SIM UE can send its own SIM information to the base station through the RRC signaling after obtaining the SIM information.

The RRC signaling may be a UE assistance information signaling. In detail, MUSIM information element may be newly added to the UE assistance information signaling to carry the SIM information.

After the multi-SIM information and state of the multi-SIM UE changes, the multi-SIM UE can update the SIM information and state through UE assistance information signaling under the condition that the reporting configuration configured by the base station is satisfied.

The base station can know that a certain multi-SIM UE includes multiple SIMs, and can know the information of multiple SIMs as needed, and can further use the information of the multiple SIMs to configure the multi-SIM UE accordingly, to reduce the occurrence of the above error events. In addition, the base station can also know the latest information and state of the multi-SIM UE, and can configure the UE accordingly according to the latest information and state of the multi-SIM UE.

Embodiments of the disclosure provide a communication device, including a processor, a transceiver, a memory, and executable programs stored in the memory and capable of being executed by the processor. When the processor runs the executable programs, the method for information transmission according to any of the above technical solutions applicable to the UE, or the method for information transmission according to any of the above technical solutions applicable to the base station is performed.

The communication device may be the above base station or UE.

The processor may include various types of storage medium. The storage medium is a non-transitory computer storage medium that can continue to memorize information stored thereon after the communication device is powered down. The communication device includes the base station or the UE.

The processor may be connected to the memory through a bus or the like, for reading executable programs stored on the memory, for example, at least one of the methods in FIGS. 2 to 5.

Embodiments of the disclosure provide a computer storage medium having executable programs stored thereon. When the executable programs are executed by a processor, the method in any technical solution of the first aspect or the second aspect of the disclosure can be performed, for example, at least one of the methods in FIGS. 2 to 5.

Figure 8:
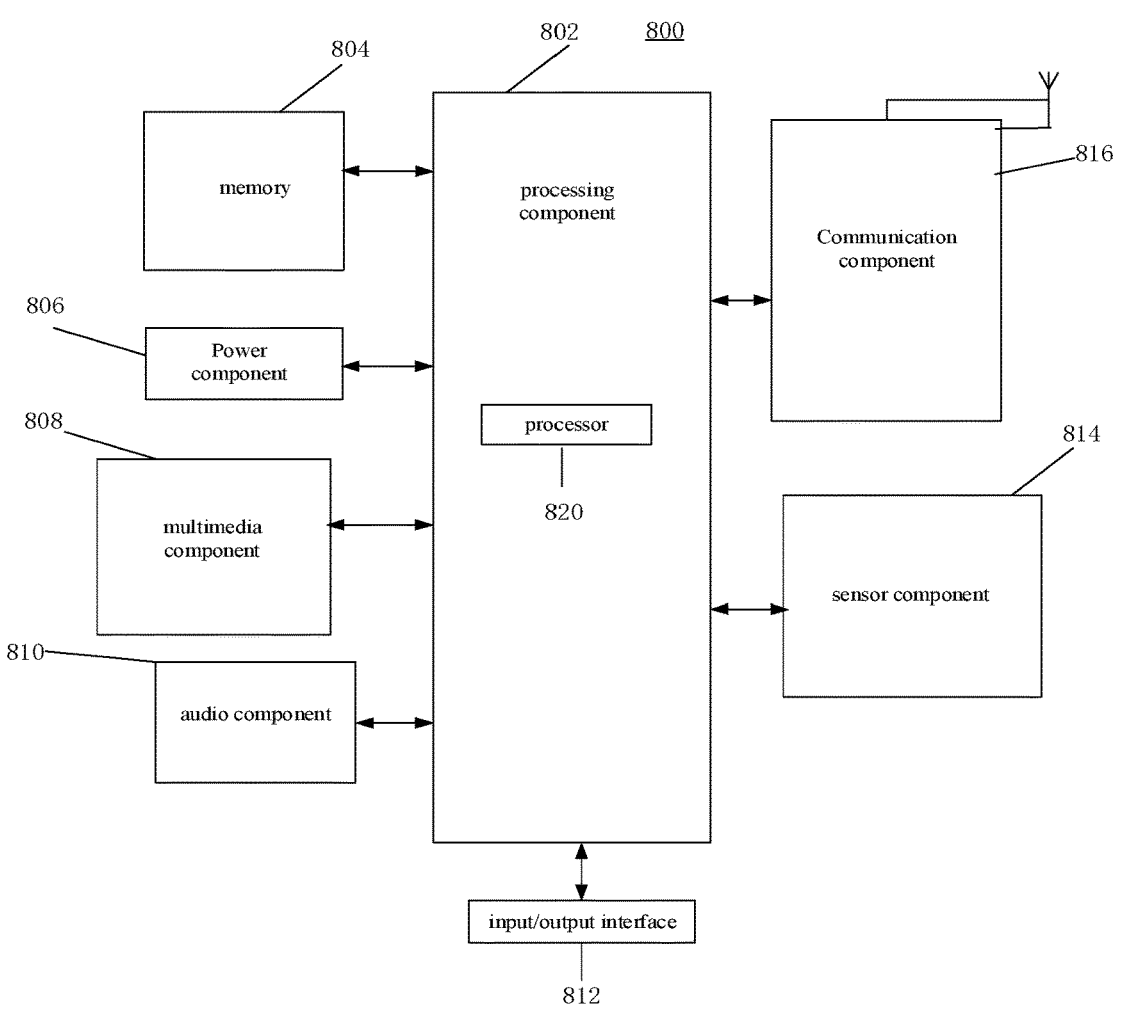
FIG. 8 is a block diagram of a UE according to some embodiments.

FIG. 8 is a block diagram of a UE 800 according to some embodiments. For example, the UE 800 may be a mobile phone, a computer, a digital broadcasting terminal, a message transceiver device, a game console, a tablet device, a medical device, a fitness device and a personal digital assistant.

As illustrated in FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the UE

800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as WiFi, 2G, or 3G, or a combination thereof. In some embodiments, the communication component 816 receives a broadcast signal or broadcast associated information from an external broadcast management system via a broadcast channel. In some embodiments, the communication component 816 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In some embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In some embodiments, there is also provided a non-transitory computer readable storage medium including instructions, such as included in the memory 804, executable by the processor 820 in the UE 800, for performing the above method. For example, non-transitory computer-readable storage medium may be a ROM, a RAM, a CD-ROM, a magnetic tape, a floppy disc, an optical data storage device, and the like.

Figure 9:
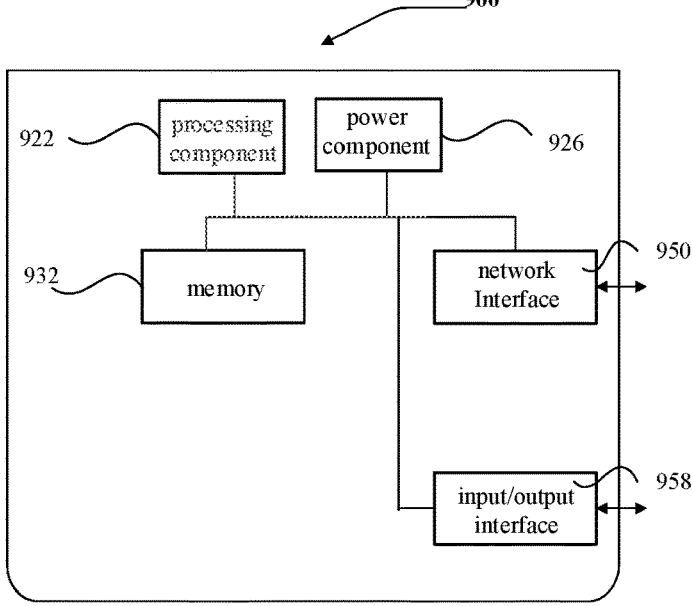
FIG. 9 is a block diagram of a base station according to some embodiments.

As illustrated in FIG. 9, embodiments of the disclosure show a structure of a base station. For example, the base station 900 may be provided as a network-side device. As illustrated in FIG. 9, the base station 900 includes a processing component 922, which includes one or more processors, and a memory resource represented by a memory 932 for storing instructions executable by the processing component 922, such as application programs. The application program stored in the memory 932 may include one or more modules, each module corresponds to a set of instructions. In addition, the processing component 922 is configured to execute instructions to perform the above method applicable to the base station, such as the method shown in FIGS. 4-5.

The base station 900 may also include a power component 926 configured to perform power management of the base station 900, a wired or wireless network interface 950 configured to connect the base station 900 to the network, and an input/output (I/O) interface 958. The base station 900 may operate based on an operating system stored on the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for information transmission, comprising:

sending, by a user equipment (UE), reporting capability information, wherein the reporting capability information is configured to indicate that the UE supports reporting subscriber identification module (SIM) information, and receiving, by the UE, reporting configuration sent based on the reporting capability information, wherein the reporting configuration is at least configured for the UE to determine whether to report the SIM information, wherein the reporting configuration comprises at least one of:

reporting permission information, configured to indicate whether the UE is permitted to report the SIM information; or reporting time limit information, configured to indicate a reporting time limit of the SIM information;

wherein the reporting time limit information comprises:

stop timer information, comprising timing information of a stop timer of stopping reporting the SIM information;

wherein sending the reporting capability information comprises:

reporting the reporting capability information by using a UE new radio capability (UE-NR-Capability) signaling.

2. The method as claimed in claim 1, wherein the reporting configuration further comprises at least one of:

reporting condition information, configured to indicate a reporting condition of the SIM information;

reporting content information, configured to indicate reporting content of the SIM information; or reporting format information, configured to indicate an information format of the SIM information.

3. The method as claimed in claim 2, wherein the reporting time limit information further comprises;

trigger timer information, comprising timing information of a trigger timer of permitting reporting the SIM information.

4. The method as claimed in claim 2, wherein the reporting condition information comprises at least one of:

first condition information, configured to indicate to report SIM information of an enabled SIM;

second condition information, configured to indicate to report SIM information of a disenabled SIM; or, third condition information, configured to indicate to report SIM information of an enabled SIM and SIM information of a disenabled SIM.

5. The method as claimed in claim 2, wherein the reporting content information is configured to indicate to report an SIM ID and/or SIM state information.

6. The method as claimed in claim 1, further comprising:

reporting, by the UE, information of at least one SIM in the UE based on the reporting configuration in response to the reporting configuration permitting the UE to report the SIM information.

7. The method as claimed in claim 6, wherein reporting the information of the at least one SIM in the UE comprises:

reporting the information of the at least one SIM in the UE by using a radio resource control (RRC) signaling.

8. The method as claimed in claim 7, wherein reporting the information of the at least one SIM in the UE by using the RRC signaling comprises:

reporting the information of the at least one SIM in the UE by using a UE assistance information signaling in the RRC signaling.

9. The method as claimed in claim 1, wherein receiving the reporting configuration sent based on the reporting capability information comprises at least one of:

receiving a RRC reconfiguration signaling sent based on the reporting capability information and carrying the reporting configuration; or, receiving a RRC connection reconfiguration signaling sent based on the reporting capability information and carrying the reporting configuration.

10. A method for information transmission, comprising:

receiving, by a base station, reporting capability information, wherein the reporting capability information is configured to indicate that a user equipment (UE) supports reporting subscriber identification module (SIM) information; and sending, by the base station, reporting configuration based on the reporting capability information, wherein the reporting configuration is at least configured for the UE to determine whether to report the SIM information, wherein the reporting configuration comprises at least one of:

reporting permission information, configured to indicate whether the UE is permitted to report the SIM information; or reporting time limit information, configured to indicate a reporting time limit of the SIM information-;

wherein the reporting time limit information comprises:

stop timer information, comprising timing information of a stop timer of stopping reporting the SIM information;

wherein receiving the reporting capability information comprises:

receiving a UE new radio capability (UE-NR-Capability) signaling carrying the reporting capability information.

11. The method as claimed in claim 10, wherein the reporting configuration further comprises at least one of:

reporting condition information, configured to indicate a reporting condition of the SIM information;

reporting content information, configured to indicate reporting content of the SIM information; or reporting format information, configured to indicate an information format of the SIM information.

12. The method as claimed in claim 11, wherein the reporting time limit information further comprises:

trigger timer information, comprising timing information of a trigger timer of permitting reporting the SIM information.

13. The method as claimed in claim 11, wherein the reporting condition information comprises at least one of:

first condition information, configured to indicate to report SIM information of an enabled SIM;

second condition information, configured to indicate to report SIM information of a disenabled SIM; or, third condition information, configured to indicate to report SIM information of an enabled SIM and SIM information of a disenabled SIM.

14. The method as claimed in claim 11, wherein the reporting content information is configured to indicate to report an SIM ID and/or SIM state information.

15. The method as claimed in claim 10, further comprising:

receiving, by the base station, SIM information in response to the reporting configuration permitting the UE to report the SIM information.

16. The method as claimed in claim 15, wherein receiving the SIM information in response to the reporting configuration permitting the UE to report the SIM information comprises:

receiving a radio resource control (RRC) signaling carrying information of at least one SIM in the UE.

17. The method as claimed in claim 16, wherein receiving the RRC signaling carrying the information of the at least one SIM in the UE comprises:

receiving a UE assistance information signaling in the RRC signaling, wherein the UE assistance information carries the information of the at least one SIM in the UE.

18. The method as claimed in claim 10, wherein sending the reporting configuration sent based on the reporting capability information comprises at least one of:

sending a RRC reconfiguration signaling carrying the reporting configuration based on the reporting capability information;

or, sending a RRC connection reconfiguration signaling carrying the reporting configuration based on the reporting capability information.

19. A communication device, comprising a processor, a transceiver, a memory, and executable programs stored on the memory and capable of being executed by the processor, wherein when the processor runs the executable programs, the communication device is configured to perform the method as claimed in claim 10.

20. A communication device, comprising a processor, a transceiver, a memory, and executable programs stored on the memory and capable of being executed by the processor, wherein when the processor runs the executable programs, the communication device is configured to:

send reporting capability information, wherein the reporting capability information is configured to indicate that the communication device supports reporting subscriber identification module (SIM) information; and receive reporting configuration sent based on the reporting capability information, wherein the reporting configuration is at least configured for the communication device to determine whether to report the SIM information, wherein the reporting configuration comprises at least one of:

reporting permission information, configured to indicate whether the communication device is permitted to report the SIM information; or reporting time limit information, configured to indicate a reporting time limit of the SIM information;

wherein the reporting time limit information comprises:

stop timer information, comprising timing information of a stop timer of stopping reporting the SIM information;

wherein send the reporting capability information comprises:

report the reporting capability information by using a UE new radio capability (UE-NR-Capability) signaling.

\*    \*    \*    \*    \*